United States Patent Office 2,990,959
Patented July 4, 1961

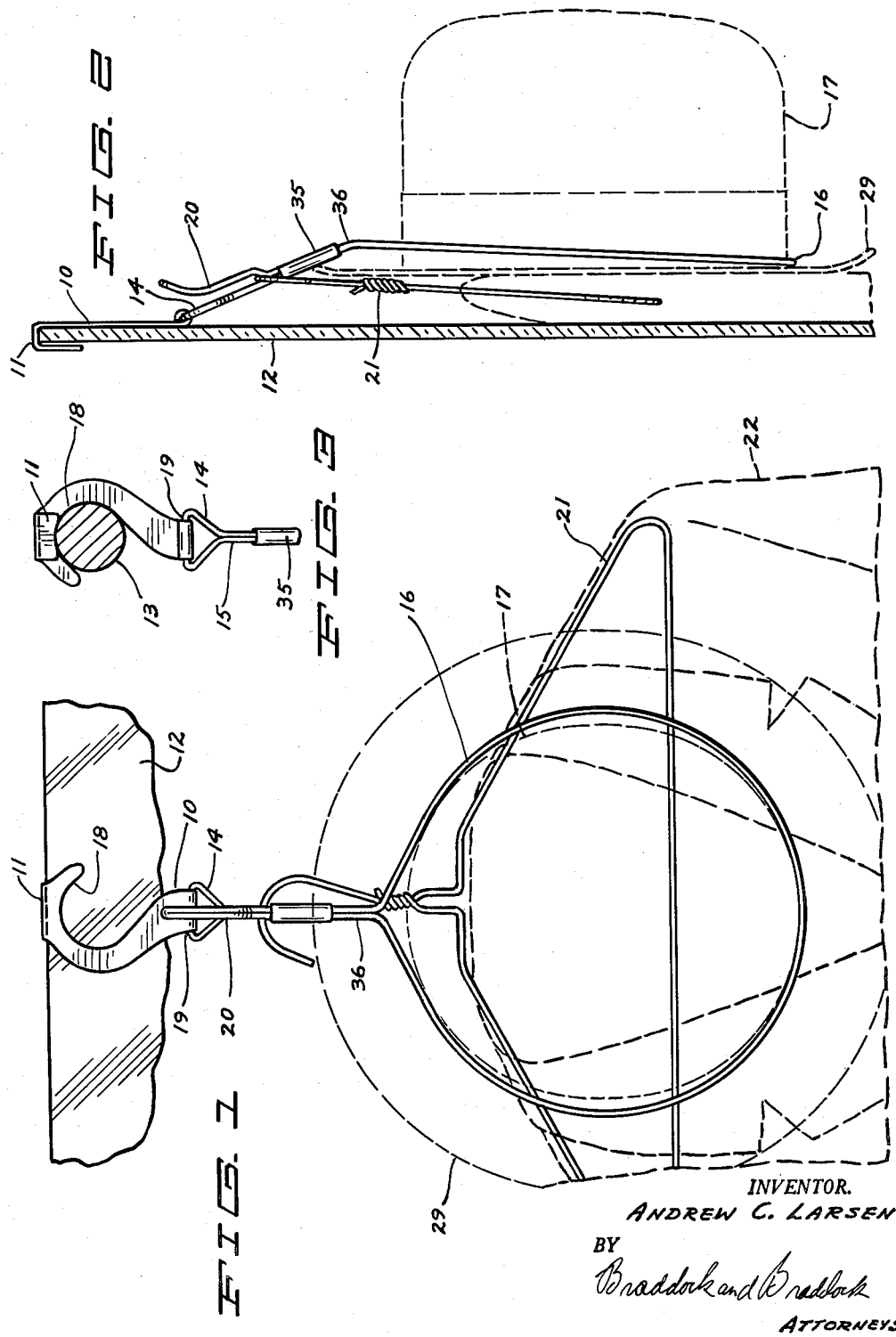
July 4, 1961     A. C. LARSEN     2,990,959
COMBINATION GARMENT HANGER
Filed May 26, 1960     2 Sheets-Sheet 1
INVENTOR.
ANDREW C. LARSEN

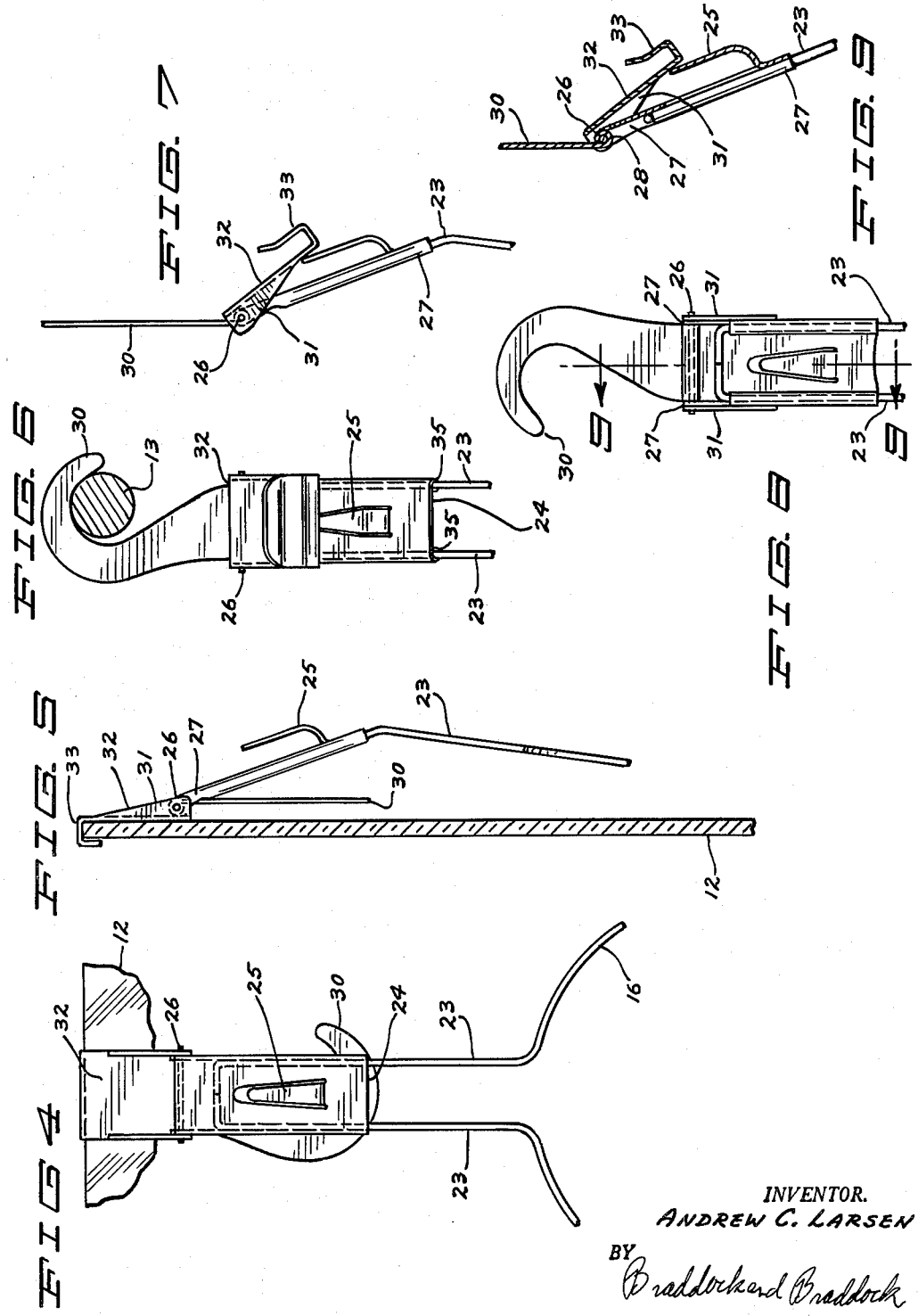

2,990,959
COMBINATION GARMENT HANGER
Andrew C. Larsen, 2438 Logan Ave. N.,
Minneapolis, Minn.
Filed May 26, 1960, Ser. No. 31,972
9 Claims. (Cl. 211—30)

The invention herein relates to garment hangers and more particularly to a hat holder and coat hanger support that can be readily attached to or removed from an automobile window and also hung on a closet rod or other support without disturbing the garments hung thereon.

Increased use of automobiles for business and overnight trips has necessitated carrying suits and a hat in automobiles while traveling and also transferring them to a motel or hotel room overnight. The present invention includes plural hooking means to allow the same unit to be hung either in an automobile or in a closet.

When driving an automobile with the windows open considerable air turbulence develops within the automobile. The invention herein also presents a weight actuated means of securely holding a hat to keep it from being blown about, damaged or lost.

In the drawings:

FIG. 1 is a front elevational view of a first form of a device made according to the present invention showing it installed on an automobile window.

FIG. 2 is an end view of a device as in FIG. 1 as seen from the left in FIG. 1;

FIG. 3 is a fragmentary rear elevational view showing the device of FIG. 1 supported by a closet support rod;

FIG. 4 is a fragmentary front elevational view of a second form of a device made according to the present invention supported by an automobile window;

FIG. 5 is a fragmentary end view of the device of FIG. 4 supported by an automobile window;

FIG. 6 is a fragmentary front elevational view of the device of FIG. 4 installed on a closet support bar;

FIG. 7 is a fragmentary end view of the device of FIG. 6 as seen from a left side thereof;

FIG. 8 is a fragmentary rear elevational view of the device of FIG. 6, and

FIG. 9 is a sectional view taken as on line 9—9 in FIG. 8.

Referring to FIGS. 1 to 3 and the numerals of reference thereon, a top support 10 has a first bight portion 18 of configuration to fit over a closet bar 13, a second portion 11 which is bent to form a U shaped hook that fits over the top edge portion of an automobile window 12, and is pivotally mounted to a base leg 19 of a triangular eye 14. Said eye 14 is fixedly attached to a downwardly extending shank portion 15 of a hat support ring 16, which decends downwardly in angular relation relative thereto, as at 36. A plane defined by said hat support ring is parallel to the base leg 19 of said eye 14. Hat support ring 16 is of dimension to slide freely over the crown of a hat 17 and engage the brim 29 of said hat in the manner indicated by dotted lines. A hook 20 is fixedly attached to shank 15 and is open toward triangular eye 14. A wire coat hanger 21, holding for example a coat 22 as shown by dotted lines, may be placed over shank 15 to engage hook 20 and hang downwardly between window 12 and hat 17.

While the ring 16 is shown as a continuous loop from one side of the shank 15 to the other, it is to be understood that this ring need not be continuous as long as it is of configuration to support the crown of a hat or the like and is, therefore, at least substantially circular or ring-like.

The support 10 may be readily removed from window 12 when the coat 22 and hat 17 are taken indoors and may be slipped over closet support rod 13 without removing or disturbing either said coat or hat. This permits quick, easy transfer of clothes from an automobile to an indoor closet without carrying a number of individual hangers or transferring the clothes to hangers after removing them from the automobile.

Bend 36 in shank 15 is located in a manner that causes the weight of hat 17 as well as the weight of any clothes supported by hook 20 to urge hat ring 16 toward window 12 and thereby prevents the hat 17 from being easily dislodged from the ring. The pivotal mounting between triangular eye 14 and support 10 allows hat ring 16 to move outwardly or inwardly from window 12 to accommodate coats or other garments supported by hook 20.

Referring now to the second form of the invention represented by FIGS. 4 to 9, a hat ring 16 has two upwardly extending arms 23, 23 which are bent at an intermediate point in an angular relationship to a plane defined by said hat ring and are fixedly attached adjacent an upper end thereof within loops 35 formed in lower ends of parallel legs 27, 27 of a channel shaped base 24. Channel shaped base 24 has an outwardly extending, upwardly open integral hook 25 upon which coat hangers may be placed in a manner substantially similar to that shown in FIGS. 1 and 3. A pivot rod 26 extends through parallel legs 27, 27 adjacent a top end of channel base 24 and pivotally engages a rolled portion 28 of a rod hook 30 which is of configuration to receive a closet bar 13. Pivot rod 26 also pivotally engages parallel legs 31, 31 of a channel shaped clip 32 having a U shaped portion 33 of configuration to fit over an automobile window 12, said U shaped portion extending in an opposite direction from said legs 31, 31.

When the garment holder is used in an automobile, clip 32 is pivoted to position and slipped over window 12. Hook 30 is allowed to pivot downwardly between window 12 and channel base 24 as illustrated in FIGS. 4 and 5. When the garment holder is placed in a closet, hook 30 is rotated upward to position to engage closet bar 13 and clip 32 is allowed to pivot forward and downward to position against hook 25 as illustrated in FIGS. 6 to 9. The weight of a hat ring 16 as well as the weight of garments hung on hook 25 acts as previously described to hold the hat firmly within the hat ring. This force with which the ring holds the hat as a result of this garment weight is also exerted by the ring on the garments themselves and tends to keep them from being dislodged by motion of the car, by air turbulence, or by accidental jostling or contact with the hanger.

What is claimed is:

1. A hanger support and hat holder including a substantially ring-like frame, a shank portion integral with said frame and extending upwardly therefrom, said shank being bent in an acute angular relation to a plane defined by said frame, support means pivotally mounted to said shank at an upper end thereof, and an upwardly open hanger support hook integral with said shank at position between said bend and said upper end.

2. The combination as specified in claim 1 wherein said support means includes a first pivotally mounted hook open to receive a support member extending substantially perpendicular to said plane defined by said frame and a second hook open to receive a support member substantially parallel to said plane defined by said frame.

3. The combination as specified in claim 2 wherein said second hook is fixedly attached to an upper edge of said first hook, said second hook being of configuration to receive an upper edge portion of an automobile window.

4. A hanger support and hat holder including a substantially circular frame, an upwardly extending shank integral with said frame and bent adjacent to said frame at an acute angle to a plane defined by said frame, a hook having a first leg fixedly attached to and extending substantially perpendicular to said shank, having a second leg integral with said first leg and extending upwardly substantially parallel to and spaced from said shank, a first support hook pivotally mounted adjacent an upper end of said shank having a bight portion situated to receive a support rod extending substantially perpendicular to said plane defined by said frame, and a second support hook having a bight portion of configuration to receive a top edge portion of an automobile window situated substantially parallel to said plane defined by said frame.

5. A hanger support and hat holder including a substantially circular wire frame, a pair of parallel arms integral with said frame and extending upwardly therefrom, said arms being bent adjacent said frame at an acute angle to a plane defined by said frame, a base fixedly attached to said arms adjacent an upper end thereof, an upwardly open hook fixedly attached to said base, a pivot member engaging said base adjacent an upper end thereof, said pivot member being substantially parallel to said plane of said frame, a first support hook pivotally engaging said pivot member and having a bight portion of configuration to receive a support rod extending substantially perpendicular to said plane of said frame, and a second support hook pivotally engaging said pivot member and having a bight portion of configuration to receive an upper edge portion of an automobile window.

6. The combination as specified in claim 5 wherein said pivot member is a cylindrical rod.

7. A hanger support and hat holder including a substantially circular wire frame, a pair of parallel arms integral with said frame and extending upwardly therefrom, said arms being bent adjacent said frame at an acute angle to a plane defined by said frame, a channel shaped base having a web and a pair of substantially parallel legs integral with said web, a portion of said legs fixedly looped over said parallel arms, a hook integral with said web having a first portion attached to and projecting substantially perpendicular from said web in a direction opposite from said channel legs and a second portion integral with said first portion and extending upwardly substantially parallel to and spaced from said channel web, a first channel shaped support hook having a web portion with a pair of substantially parallel legs of dimension to fit over said legs of said base, said hook legs extending along a portion of the length of said hook web, a U shaped portion formed from a portion of said hook web extending outwardly therefrom in a direction opposite from said hook legs, said U shaped portion being of configuration to receive an automobile window situated substantially parallel to said plane defined by said frame, a rod extending pivotally through said hook legs and engaging said base legs, a second support hook formed from a flat sheet of metal pivotally looped about said rod at a lower end of said second support between the legs of said base and having an overhanging bight portion at an upper end thereof of configuration to receive a support rod extending substantially perpendicular to said plane of said frame.

8. A hanger support and hat holder including a substantially circular frame, a shank portion integral with said frame and extending upwardly therefrom, said shank being bent adjacent said frame at an acute angle to a plane defined by said frame, a hook having a first leg fixedly attached to and extending substantially perpendicular from said shank, a second leg integral with said first leg and extending upwardly substantially parallel to and spaced from said shank, a triangular eye fixedly attached at an upper end of said shank having a base leg substantially perpendicular to said shank and substantially parallel to said plane defined by said frame, and a support member pivotally looped around said base leg having a first bight portion of configuration to fit over a support rod extending substantially perpendicular to said plane of said frame and a second bight portion fixedly attached to a top edge of said support member, said second bight portion being of configuration to fit over a top edge portion of an automobile window situated substantially parallel to said plane of said frame.

9. A hat holder including a substantially circular frame, a shank portion integral with said frame and extending upwardly therefrom, said shank being bent adjacent said frame at an acute angle to a plane defined by said frame, a triangular shaped eye at an upper end of said shank having a base leg substantially parallel to said plane defined by said frame, a first hook having a first leg fixedly attached to said shank between said bend and said eye and a second leg integral with said first leg and extending upwardly parallel to and spaced from said shank, and a support member pivotally fastened to said leg, said support member having a second hook open to receive a support rod extending substantially perpendicular to said plane of said frame and having a third U shaped hook open to receive an automobile window situated substantially parallel to said plane defined by said frame.

References Cited in the file of this patent
UNITED STATES PATENTS

| | | |
|---|---|---|
| 2,108,678 | Kulhawy | Feb. 15, 1938 |
| 2,630,921 | Stephenson | Mar. 10, 1953 |
| 2,643,773 | Nicholson | June 30, 1953 |